United States Patent Office 3,204,858
Patented Sept. 7, 1965

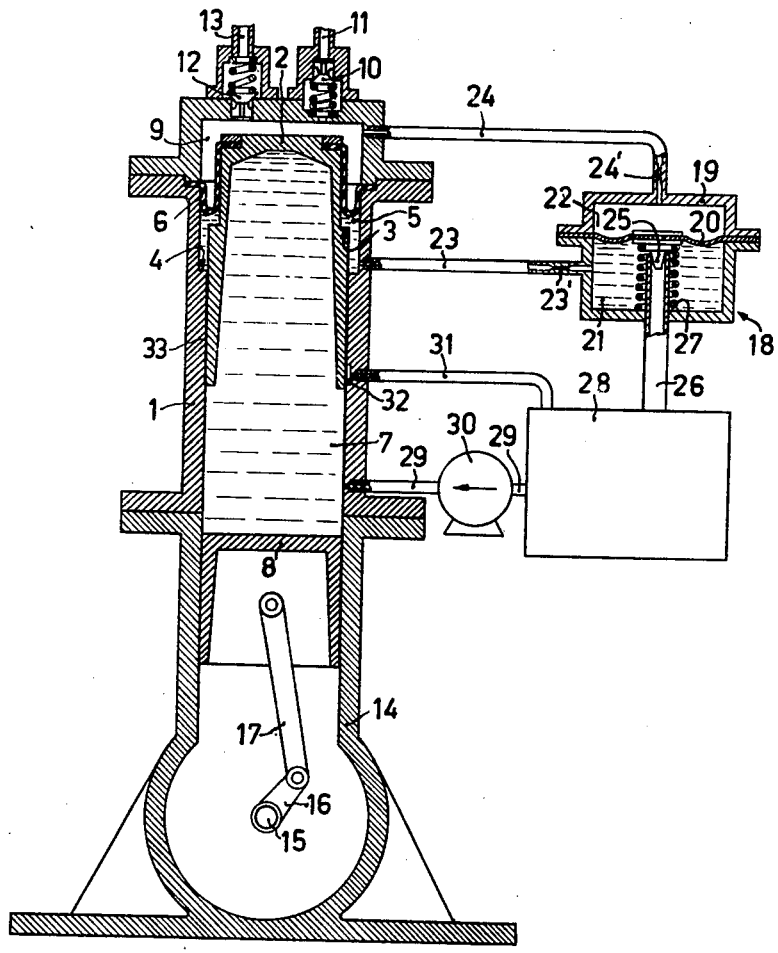

3,204,858
PISTON CYLINDER MEANS WITH FLUID-COUPLED DRIVE MEANS AND ROLLING DIAPHRAGM SEAL
Albert August Dros, Emmasingel, Eindhoven, Netherlands, assignor to North American Philips Company, Inc., New York, N.Y., a corporation of Delaware
Filed June 21, 1963, Ser. No. 289,503
Claims priority, application Netherlands, July 10, 1962, 280,774
5 Claims. (Cl. 230—49)

The invention relates to a device comprising a cylinder and a piston for separating two spaces which is adapted to reciprocate within the cylinder and is coupled to a driving means. The device is provided with a seal between the piston and the cylinder which is in the form of a rolling diaphragm and that is located between one of the two spaces and an auxiliary space which is filled with a liquid. The space sealed by the rolling diaphragm contains a gas.

The device in accordance with the invention is characterized in that the other space contains a displaceable column of liquid which forms the coupling between the piston and the driving means. Although the device according to the invention contains a liquid under pressure on one side of the piston and gas under pressure on the other side thereof, the use of a rolling diaphragm as a seal prevents leakage of liquid into the space containing the gas. Coupling the driving gear to a piston through a displaceable column of liquid provides the advantage of a great degree of freedom in the choice of the disposition of the piston relative to the driving means without the known complicated driving gears having to be used which all comprise a large number of component parts and pivot points subjected to wear.

Another embodiment of the device according to the invention is characterized in that the boundaries of the auxiliary space are formed partly by the rolling diaphragm and partly by wall portions of the piston and cylinder which are shaped so that by their mere shapes the volume of the auxiliary space remains at least substantially constant during the reciprocating movement of the piston within the cylinder. It is desirable for the rolling diaphragm to be continuously held in a stretched condition during operation of the device. This implies that the auxiliary space must contain an amount of liquid such that by the pressure of the gas in the space above the rolling diaphragm the latter is always pressed in a stretched condition against the liquid contained in the auxiliary space so that this liquid acts as a support for the rolling diaphragm. Since the liquid in the auxiliary space is at least substantially incompressible, it will be appreciated that the cross-sectional length of the diaphragm, i.e. the length of a diametrical section of the diaphragm measured on its surface, remains constant.

The auxiliary space may contain an amount of liquid such that the rolling diaphragm has its convex side orientated towards the space containing the gas. In this case the pressure of the liquid in the auxiliary space must exceed the pressure of the gas in the sealed space to maintain the diaphragm in a stretched condition at all times. As an alternative, the auxiliary space may contain an amount of liquid such that the diaphragm has its concave side orientated towards the space containing the gas. In this case the pressure of the liquid in the auxiliary space must be lower than the pressure of the gas contained in the sealed space. Although the material of which the rolling diaphragm is made is completely impermeable to liquid, gas may diffuse through the rolling diaphragm to the liquid contained in the auxiliary space. In order to prevent the gas diffused into the auxiliary space from producing bubbles in the liquid, as a result of which the incompressibility of the medium in this auxiliary space would be lost, a further embodiment of the device according to the invention is disclosed herein. This further embodiment contemplates that while the pressure in the auxiliary space filled with liquid is lower than the pressures in the other two spaces, the auxiliary space and the space containing the displaceable column of liquid communicate with one another. This embodiment provides a control mechanism responsive to the pressure difference across the diaphragm, which mechanism is capable of discharging liquid and maintaining a constant pressure difference across the diaphragm. Through the communication duct, liquid of the displaceable column of liquid will be supplied to the auxiliary space in an amount which obviously depends upon the dimensions of said duct and the pressure difference across it, while the control mechanism ensures that the excess liquid supplied is discharged. Together with the discharged liquid part of the gas which has diffused through the diaphragm and is dissolved in the liquid will be discharged so that the formation of gas bubbles in the auxiliary space is prevented. An additional advantage of supplying liquid to the auxiliary space and discharging liquid therefrom is that it provides a certain cooling of the rolling diaphragm, by which the life thereof is prolonged.

According to a further advantageous embodiment of the device according to the invention, the communication duct between the auxiliary space and the space containing the displaceable column of liquid is the interstice between the piston and the wall of the cylinder. This particularly simple structural embodiment has the further advantage that the piston effectively runs in an oil bath.

By causing the space filled with liquid below the rolling diaphragm and the space containing the displaceable column of liquid to communicate with one another the advantage is obtained that only one kind of liquid is required in the device.

A further advantage is that, in contradistinction to the known devices which employ rolling diaphragms supported by liquid, no additional liquid-supply device is required. Due to the constant pressure difference prevailing between the liquid-filled space below the rolling diaphragm and the space containing the displaceable column of liquid a constant amount of liquid will be supplied through the communication duct per unit of time.

A further advantageous embodiment of the device according to the invention is characterized in that the communication duct between the auxiliary space and the space containing the displaceable column of liquid is dimensioned so that at least such an amount of liquid flows through the communication duct to the auxiliary space that at the pressures which occur in said space the concentration of the gas diffused through the diaphragm and dissolved in the liquid contained in said space remains below the saturation concentration of said gas in said liquid.

In order that the invention may readily be carried into effect, an embodiment thereof will now be described, by way of example, with reference to the accompanying diagrammatic drawing.

The drawing is a cross-sectional view of a compressor in which the seal between the piston and the cylinder takes the form of a rolling diaphragm while the coupling between the piston and the driving means is constituted by a displaceable column of liquid.

In the drawing, reference numeral 1 denotes a cylinder in which a driven piston 2 is adapted to reciprocate. The driven piston 2 comprises two portions of different diameters so that an annular surface 3 is formed, and the cylinder 1 also comprises two portions of different diameters so as to form an annular surface 4. The resulting space 5 between the piston and the cylinder wall is closed at its upper end by a rolling diaphragm 6. Since the piston and the cylinder are designed so that the areas of the surfaces 3 and 4 are equal, on movement of the piston relative to the cylinder the volume of the space 5 will not vary provided that the cross-sectional length of the rolling diaphragm remains unchanged. The lower face of the piston 2 rests upon a column of liquid 7 which is displaceable owing to the fact that the other end of the liquid column is bounded by a drive piston 8. The upper face of the driven piston 2 bounds a space 9 containing a gas to be compressed. The space 5 below the rolling diaphragm is entirely filled with liquid.

The space 9 communicates with a gas supply duct 11 through an inlet valve 10 and with a gas discharge duct 13 through an outlet valve 12. The cylinder 1 is secured to a machine frame 14 which houses a crankshaft 15, a crank 16 secured thereto and a connecting rod 17 which connects the drive piston 8 to the crank 16. The crankshaft 15 is coupled to a driving means (not shown).

The compressor further includes a control mechanism 18. This control mechanism takes the form of a housing 19 which is subdivided in two portions 21 and 22 by a diaphragm 20. The space 5 below the rolling diaphragm 6 is in open communication with the space 21 through a duct 23. The space 9 above the driven piston 2 is in open communication with the space 22 through a duct 24. Thus the same pressure difference is produced across the diaphragm 20 and across the rolling diaphragm 6. The diaphragm 20 carries a valve 25 which is adapted to close or open a liquid-discharge duct 26 in accordance with the position of the diaphragm 20. The control mechanism 18 further comprises a compression spring 27 which acts upon the diaphragm 20 and enables a desired pressure difference to be set across the diaphragms 20 and 6. To prevent the diaphragm 20 from falling into resonance due to rapid pressure fluctuations, constrictions 23' and 24' are provided in the ducts 23 and 24 for damping the pressure fluctuations. The liquid discharge duct 26 opens into a liquid container 28. A pipe 29 in which a liquid pump is mounted, also opens into the liquid container 28. The pipe 29 at its other end opens into the cylinder 1.

A third duct 31 connects the liquid container to the cylinder at 32. The position of the orifice 32 is chosen so that the orifice is uncovered only when the piston has reached its uppermost position, so that the uppermost position of the piston is fixed.

The compressor operates as follows:

When the crankshaft 15 is driven the drive piston 8 performs a reciprocating movement which is transmitted to the driven piston 2 by the displaceable liquid column 7. As a result the gas in the space 9 is compressed. To ensure satisfactory operation of the rolling diaphragm 6 it is desirable for a substantially constant pressure difference to be maintained across this diaphragm. This is ensured by the control mechanism 18 which operates as follows. With a correct pressure difference across the rolling diaphragm 6, under the action of the forces exerted on the diaphragm 20 by the liquid in the space 21, the compression spring 27 and the pressure of the gas in the space 22, the lateral diaphragm ensures a position such that the orifice of the liquid discharge duct 26 in the space 21 is closed by the valve 25. If now the pressure difference across the rolling diaphragm 6 is decreased, the diaphragm 20 and hence the valve 25 will be lifted by the spring 27 because the same pressure difference is produced across the diaphragm 20, so that the orifice of the discharge duct 26 is uncovered and liquid can be discharged from the space 5 through the duct 23 and the space 21 until the correct pressure difference is again produced across the rolling diaphragm 6.

Since the rolling diaphragm 6 is completely impermeable to liquid, the gas in the space 9 will remain completely free of liquid. This is a great advantage for systems which incorporate gas-containing spaces required to remain free from liquid, for example, air-compressors. Although the rolling diaphragm is completely liquid-tight, gas is capable of diffusing through this diaphragm. This has the disadvantage that a certain amount of gas may penetrate to the space 5 so that the incompressibility of the medium in this space is lost and the rolling diaphragm 6 is no longer supported by a solid medium but by a slight resilient medium so that with fluctuations in the pressure in the space 9 the rolling diaphragm 6 may be expanded. According to the invention to obviate this disadvantage the space 5 communicates with the column of liquid 7 so that a certain amount of liquid from the space containing this column 7 is enabled to flow to the space 5, the excess liquid being discharged from said space 5 by the control mechanism 18. This prevents the concentration of the gas diffused into the space 5 from increasing to a value such as to form gas-bubbles in said space 5.

In the compressor shown the communication between the displaceable liquid column 7 and the space 5 takes the form of the interstice 33 between the driven piston 2 and the cylinder wall 1. It will be appreciated that this communication may also take the form of a narrow duct. Employing the interstice between the piston and the cylinder provides the additional advantage that the piston and the cylinder are always separated by a sufficient amount of liquid, so that a state of perfect lubrication is obtained.

The liquid which leaks from the space 7 containing the displaceable liquid column through the interstice 33, the space 5, the duct 23, the control mechanism 18 and the liquid-discharge duct 26, and the liquid which flows from the space 7 through the duct 31 at each stroke, are returned to said space 7 by the pump 30.

Although in the embodiment described the cylinder 1 is directly secured to the frame 14, it will be appreciated that the cylinder 1 with its associated equipment and the frame 14 may be arranged separately, in which arrangement the space below the driven piston 2 and the drive space above the piston 8 are connected to one another by a pipe.

In addition to a particularly simple and compact construction the invention provides the advantage that in spite of the hydraulic drive of the piston the gas space remains completely free from liquid and furthermore the occurrence of gas bubbles in the liquid supporting the rolling diaphragm is entirely precluded.

A further advantage is that by the use of a rolling diaphragm in machines of the kind to which the invention relates the swept volume can be greater than in the known diaphragm compressors.

What is claimed is:

1. A piston cylinder means comprising a cylinder, a drive piston, driving means for reciprocating said drive piston in said cylinder, a driven piston adapted for reciprocating in said cylinder, said driven piston defining with said cylinder two spaces, a rolling diaphragm seal between said driven piston and adjacent portion of said cylinder dividing one of said spaces into an auxiliary space filled with a liquid, while the other part of said one space contains a gas, and the other of said spaces containing a displaceable column of liquid which constitutes the driving coupling between said drive piston and said driven piston.

2. A piston cylinder means as claimed in claim 1 wherein said cylinder and driven piston are stepped thereby forming a particular shape of said auxiliary space whereby the volume of the auxiliary space remains substantially constant during the reciprocating movement of said driven piston in said cylinder.

3. A piston cylinder means comprising a cylinder, a drive piston, driving means for reciprocating said drive piston in said cylinder, a driven piston adapted for reciprocating in said cylinder, said driven piston defining with said cylinder two spaces, a rolling diaphragm seal between said driven piston and adjacent portion of said cylinder dividing one of said spaces into an auxiliary space filled with a liquid, while the other part of said one space contains a gas, and the other of said spaces containing a displaceable column of liquid which constitutes the driving coupling between said drive piston and said driven piston, the pressure in the other of said spaces being lower than the pressures prevailing in the auxiliary space and the other part of said one space, means communicating said auxiliary space with the other of said spaces, and a control mechanism connecting said auxiliary space and the other part of said one space and being responsive to the pressure difference across said diaphragm seal by which the liquid can be discharged.

4. A piston cylinder means as claimed in claim 3 wherein said means communicating said auxiliary space with the other of said spaces is an interstice located between the driven piston and the adjacent cylinder wall.

5. A piston cylinder means as claimed in claim 4 wherein said interstice is dimensioned so that the amount of liquid flowing through it to the auxiliary space is at least such that at the pressures occurring in said auxiliary space the concentration of the gas diffusing through said diaphragm seal and dissolved in the liquid contained in said auxiliary space remains below the saturation concentration of said gas in said liquid.

References Cited by the Examiner

UNITED STATES PATENTS

| 1,650,377 | 11/27 | Nixon | 103—44 |
| 1,905,284 | 4/33 | Heitger | 103—44 |
| 3,043,338 | 7/62 | Hanson | 92—99 |

FOREIGN PATENTS 589,713  2/25  France.

RICHARD B. WILKINSON, *Primary Examiner.*